United States Patent [19]

Bitoh

[11] Patent Number: 4,788,587
[45] Date of Patent: Nov. 29, 1988

[54] DOCUMENT READING APPARATUS UTILIZING PRINTER MECHANISM WITH A COLOR FILTER TAPE

[75] Inventor: Hiroyasu Bitoh, Tokyo, Japan

[73] Assignee: Casio Computer Co., Ltd., Tokyo, Japan

[21] Appl. No.: 56,321

[22] Filed: May 28, 1987

Related U.S. Application Data

[63] Continuation of Ser. No. 680,508, Dec. 11, 1984, abandoned.

[30] Foreign Application Priority Data

Dec. 26, 1983 [JP] Japan .................. 58-244211
Dec. 27, 1983 [JP] Japan .................. 58-248713

[51] Int. Cl.⁴ .................. H04N 1/46; H04N 1/024
[52] U.S. Cl. .................. 358/75; 358/78; 358/285; 358/296
[58] Field of Search .......... 358/75, 78, 285, 284, 358/296, 293, 286

[56] References Cited

U.S. PATENT DOCUMENTS

| | | | |
|---|---|---|---|
| 2,523,400 | 9/1950 | Thompson | 358/289 X |
| 4,404,598 | 9/1983 | Scuilli | 358/289 X |
| 4,412,225 | 10/1983 | Yoshida et al. | 358/75 IJ X |
| 4,525,748 | 6/1985 | Carbone | 358/293 X |
| 4,682,042 | 7/1987 | Igarashi | 358/293 |

FOREIGN PATENT DOCUMENTS

| | | | |
|---|---|---|---|
| 2320962 | 7/1976 | Fed. Rep. of Germany . | |
| 3027769 | 2/1982 | Fed. Rep. of Germany . | |
| 3734 | 1/1975 | Japan . | |
| 133733 | 9/1979 | Japan . | |
| 53126808 | 4/1980 | Japan | 358/75 |
| 32833 | 8/1984 | Japan . | |
| 59-228461 | 12/1984 | Japan | 398/293 |
| 59-230360 | 12/1984 | Japan | 358/293 |
| 59-230361 | 12/1984 | Japan | 358/293 |
| 1222584 | 2/1981 | United Kingdom . | |
| 1584604 | 2/1981 | United Kingdom . | |
| 2078055 | 12/1981 | United Kingdom | 358/75 |

Primary Examiner—James J. Groody
Assistant Examiner—Robert M. Bauer
Attorney, Agent, or Firm—Frishauf, Holtz, Goodman & Woodward

[57] ABSTRACT

In an apparatus using a printer mechanism for reading a document wound around a platen of a printer, when a document is read, and ink ribbon cassette mounted on a carriage of the printer for printing is replaced with a cassette case having a reading section therein, while the printing head remains fixed on the carriage. The reading section is located such that a lens barrel mounting an image sensor thereon is positioned for reading the document without being interfered with by the fixed printing head.

2 Claims, 7 Drawing Sheets

DOCUMENT READING APPARATUS UTILIZING PRINTER MECHANISM WITH A COLOR FILTER TAPE

This application is a continuation of application Ser. No. 680,508, filed Dec. 11, 1984, now abandoned.

BACKGROUND OF THE INVENTION

The present invention relates to a document reading apparatus utilizing a printer mechanism.

In a conventional printer, a printing head and a ribbon-feed driving section are arranged on a carriage which moves along the longitudinal direction of a platen. A ribbon take-up spindle is engaged with the ribbon-feed driving section so as to feed an ink ribbon or an ink tape inside a ribbon cassette set on the carriage. At the same time, the printing head transfers ink from the ink ribbon or ink tape onto a sheet wound around the platen.

Instead of a conventional reading apparatus for reading a document including characters or figures, an apparatus has been recently proposed to read documents utilizing a printer.

In order to read a document using such a printer, a sheet on which document information is printed is wound around a platen. A ribbon cassette mounted on the carriage is removed, and a line image sensor is mounted instead. Then, as the carriage is moved, the image sensor scans along the widthwise direction of the sheet, and the platen is rotated after reading each line, thereby sequentially reading the document.

However, in a conventional reading apparatus of this type, when the line image sensor is mounted, it is aligned linearly with a thermal head used for printing with respect to the sheet. Therefore, the thermal head itself must be removed. The mounting and removal of the thermal head is a complex procedure, and results in inconvenience. An example of an arrangement wherein the ribbon cassette and the thermal head are removed for reading a document is described in Japanese Patent Disclosure No. 50-3734. Another arrangement is described in Japanese Patent Disclosure No. 59-32833 or Japanese Utility Model Disclosure No. 54-133733. In this arrangement, the thermal head and the image sensor are arranged so as to be offset from a sheet, that is, they are not aligned linearly with respect to the sheet. However, in either arrangement, the thermal head and the image sensor are arranged on a single carriage or unit so that the overall reading apparatus becomes bulky.

In order to read a color image of a document, an image-pickup area-type color image sensor, which uses a dichroic mirror frequently used in a TV camera, may be used. However, since three image sensors for three colors must be used and these image sensors are relatively expensive, the overall apparatus becomes expensive. In another color reading apparatus, a disk surface is divided into three regions in which three filters of three respective colors are arranged. The disk is rotated in front of a general image sensor so that red, blue and green transmission filters alternately oppose the image sensor. When the red transmission filter opposes the image sensor, the image sensor produces a red signal. When the blue transmission filter opposes the image sensor, the image sensor produces a blue signal. When the green filter opposes the image sensor, the image sensor produces a green signal. In such a color reading apparatus, since only a single image sensor need be used, color image reading can be performed at low cost. On the other hand, in a color reading apparatus of the filter type, mounting the respective color filters on a carriage of the printer and a compact arrangement for the replacement of the respective color filters present problems. These problems are considered difficult to solve.

SUMMARY OF THE INVENTION

The present invention has been made in consideration of this and has for its object to provide a document reading apparatus utilizing a printer mechanism in which a printing head fixed on a carriage and a reading means in a cassette can be mounted in a state wherein they are not aligned with respect to a sheet, when characters or figures printed on the sheet as wound around a platen of the printer, are read.

In order to achieve the above object, a document reading apparatus utilizing a printer mechanism according to the present invention comprises a carriage means for moving along a longitudinal direction of a platen, a cassette case means mounted on said carriage means when a document wound around said platen is to be read, and a reading means housed inside said cassette case means and located at a position so as not to be interferred with by a printing head for printing during the reading of the document while said printing head is fixed on said carriage means.

With the apparatus of the present invention, when a document is read while the printing head is fixed on the carriage of the printer, the reading means inside the cassette case is mounted on the carriage such that it is not aligned perpendicularly with the printing head with respect to the document. Therefore, the document can be easily read by a simple operation without removing or mounting the printing head.

According to the reading apparatus of the present invention, in order to allow the reading of a color document, an image sensor, an endless tape having three continuous red, blue and green transmission filter portions, and a drive section for driving the tape can be arranged in tee cassette case mounted on the carriage. The tape can be replaced with another tape having filter portions arrayed in a different order.

DETAILED DESCRIPTION OF THE PREFERRED EMBODIMENTS

The preferred embodiment of the present invention will now be described with reference to the accompanying drawings.

An example of a printer to be utilized in a document reading apparatus according to the present invention will first be described with reference to FIG. 1.

Figure 1:
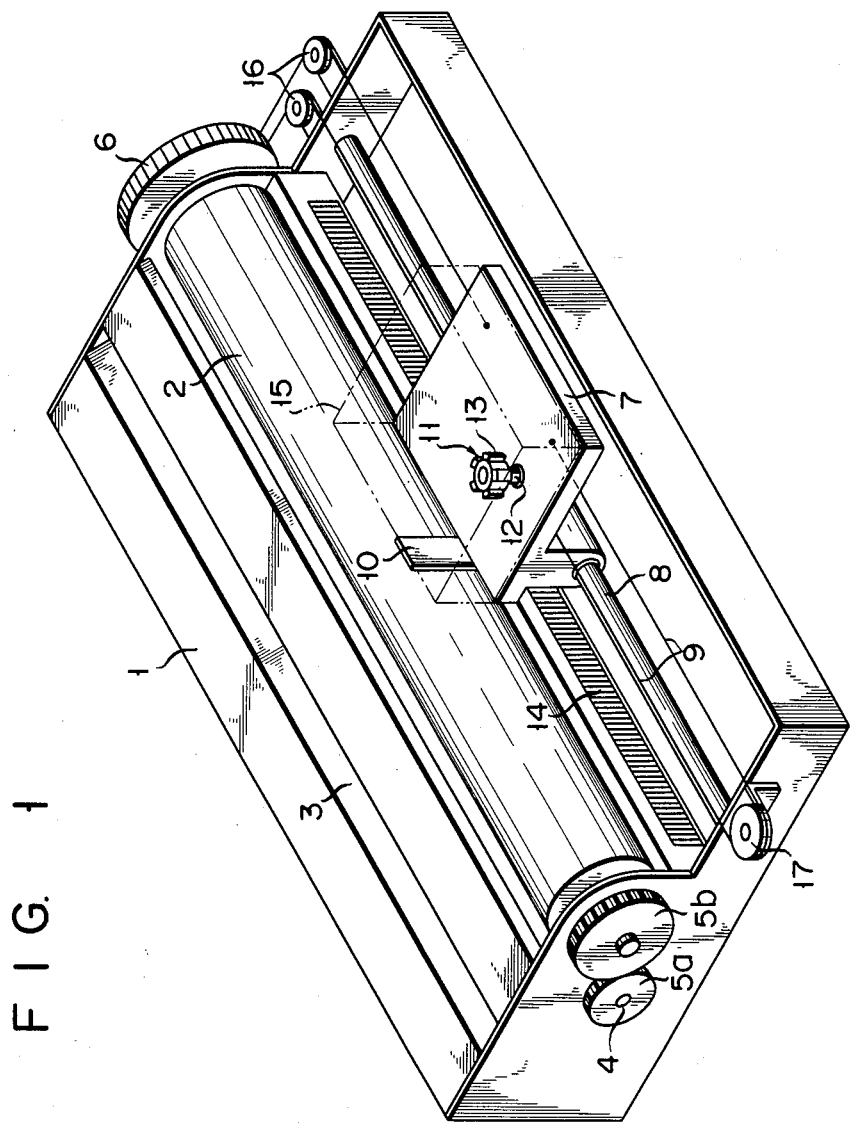
FIG. 1 is a perspective view showing a printer in which a cassette case having a reading means inside is dismounted from a carriage, according to an embodiment of the present invention.

FIG. 1 shows a thermal printer of the heat transfer type, including a printer housing 1, a platen 2, and a sheet feed port 3. A printing paper sheet is inserted into the sheet feed port 3 and is wound around the platen 2. The sheet is fed in predetermined amounts by a paper feed roller (not shown) driven by a stepping motor and is thus driven to a position above the platen 2 as printing progresses. A drive shaft 4 is associated with the paper feed roller; and, paper feed knobs 5a and 5b are provided for manually driving the platen 2.

Referring to FIG. 1, a carriage 7 is movable along the longitudinal direction of the platen 2 and is guided by a guide shaft 8 so as to reciprocate at a predetermined speed by a carriage feed wire 9 looped around pulleys 16 and 17. Ends of the wire 9 are fixed to the carriage 7.

A printing thermal head 10 is arranged at the front end portion of the carriage 7, which opposes the platen 2. A ribbon-feed driving section 11 is arranged on the carriage 7. The ribbon-feed driving section 11 consists of a ribbon-feed driving hub 13 fixed on the upper end of a drive shaft 12 extending through the carriage 7 and on a gear mechanism (not shown) arranged below the carriage 7 for driving the drive shaft 12. The gear mechanism meshes with a rack 14 arranged on the printer housing 1 along the direction of movement of the carriage 7. The carriage 7 is driven in this state to drive the drive shaft 12.

A ribbon cassette 15 is mounted on the upper surface of the carriage 7. The outer shape of the ribbon cassette 15 is shown by an imaginary line in FIG. 1. An ink ribbon wound around reels and a take-up spindle are housed inside the cassette case. The ribbon cassette 15 is mounted on the carriage 7 by fitting the ribbon take-up spindle with the ribbon-feed driving hub 13 of the ribbon-feed driving section 11 on the carriage 7.

In this thermal printer, the carriage 7 is moved in the longitudinal direction of the platen 2. The ink ribbon in the ribbon cassette 15 mounted on the carriage 7 is driven by the ribbon-feed driving section 11 in synchronism with the speed with which the carriage 7 moves. The thermal head 10 transfers ink from the ink ribbon in dot forms onto the printing paper sheet wound around the platen 2. In the printing mode, the carriage 7 feeds the ink ribbon from the home position (left end) to the return position (right end), while the gear mechanism of the ribbon-feed driving section 11 meshes with the rack 14 of the printer housing 1, thereby allowing the predetermined transfer operation. When a carrier return is made after printing one line, the gear mechanism disengages from the rack 14 (the carriage 7 is pivoted in a direction away from the platen 2), and the ink ribbon is not fed. Thus, the thermal head 10 is returned to the home position.

The above embodiment is described with reference to a thermal printer of heat transfer type. However, the present invention is not limited to this and can be similarly applied to a photoprinter using an LED array or a wire dot printer. A description will now be made with reference to an embodiment wherein the printer as described above is applied to a document reading apparatus of the present invention.

Figure 2:
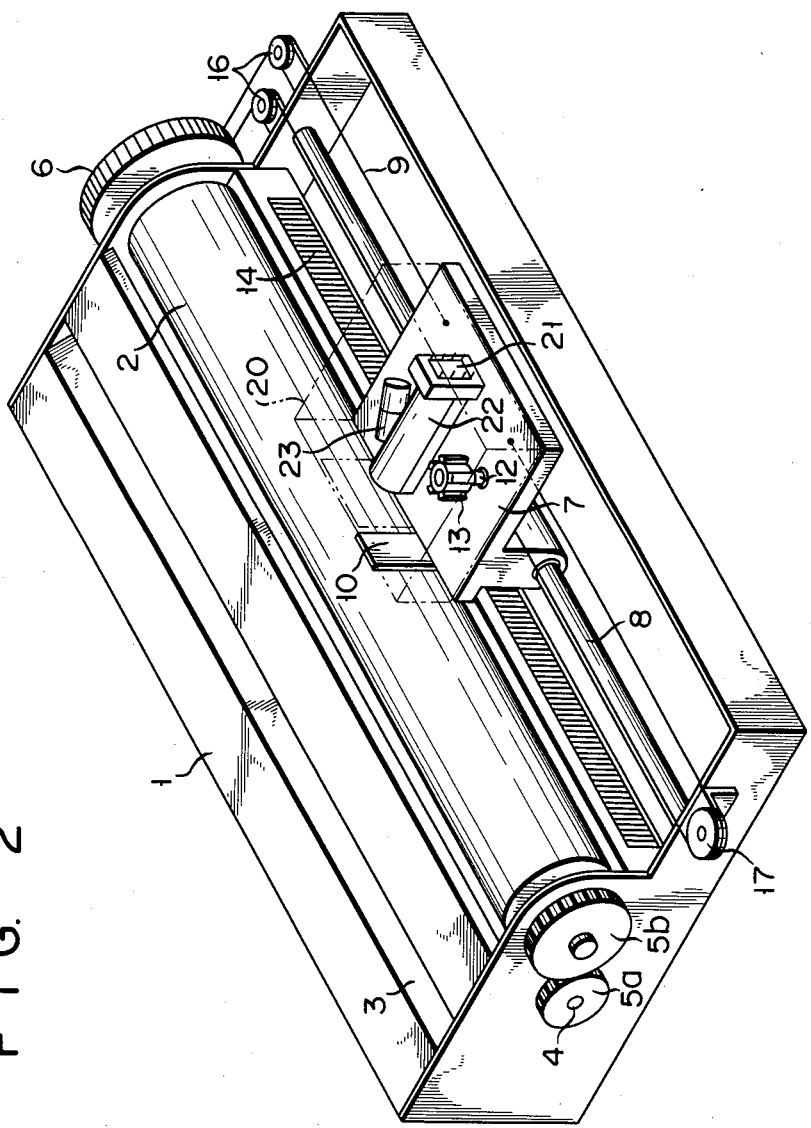
FIG. 2 is a perspective view of the printer in which the cassette case having the reading means inside is mounted on the carriage.

FIG. 2 shows a state wherein the ribbon cassette 15 on the carriage 7 shown in FIG. 1 is removed, and a cassette 20 of a similar shape is mounted in its place. The same reference numerals as in FIG. 1 denote the same parts in FIG. 1, and a detailed description thereof will be omitted.

Inside the cassette 20, an image sensor 21, a lens barrel 22, and a document illuminating lamp 23 are arranged at predetermined positions.

Figure 3:
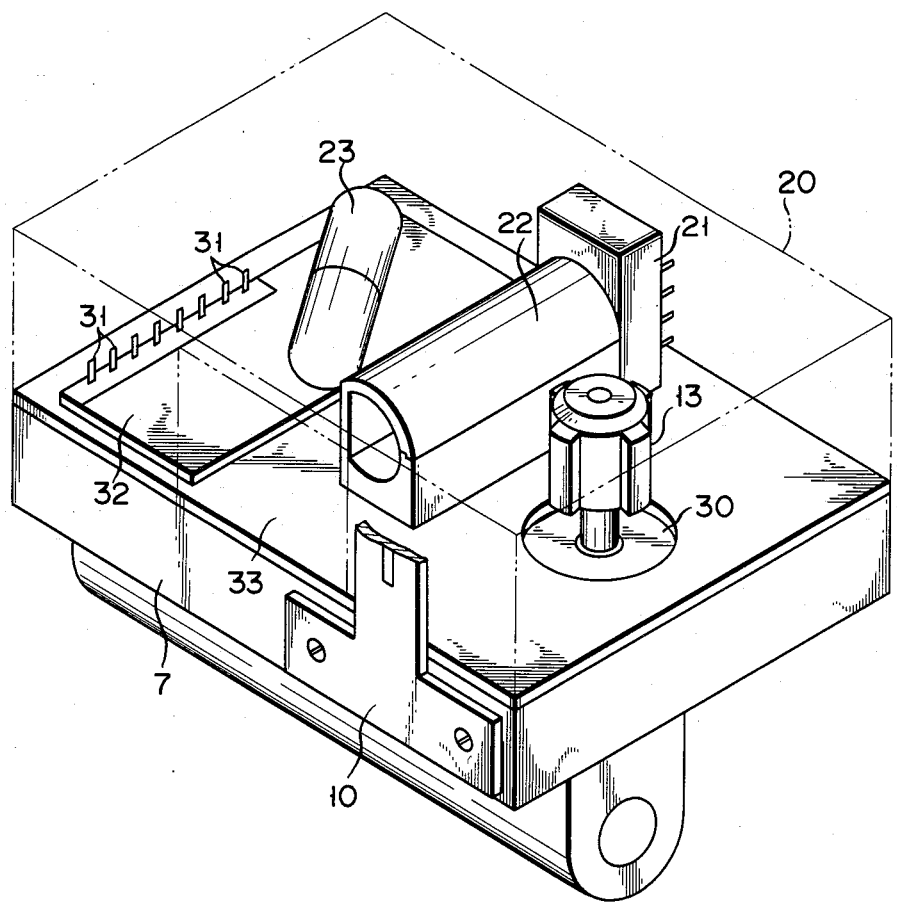
FIG. 3 is an enlarged perspective view of the reading means shown in FIG. 2.

FIG. 3 is an enlarged perspective view showing the internal arrangement of the cassette 20 shown in FIG. 2 as mounted on the carriage 7 and the arrangement of the thermal head 10. A hole 30 through which the ribbon-feed driving hub 13 protrudes is formed in the lower surface of the cassette 20. A printed circuit board 32 having a connector 31 and a drive circuit (not shown) for driving the image sensor 21 are arranged inside the cassette 20. Ends of the connector are positioned along the rear surface of the cassette 20 and contact a flexible connector on the carriage 7 upon being placed thereon, thereby providing an electrical connection with a reading control circuit (not shown). A document reading window 33 is formed at one side surface of the cassette 20 so as to oppose the lens barrel 22.

Figure 4:
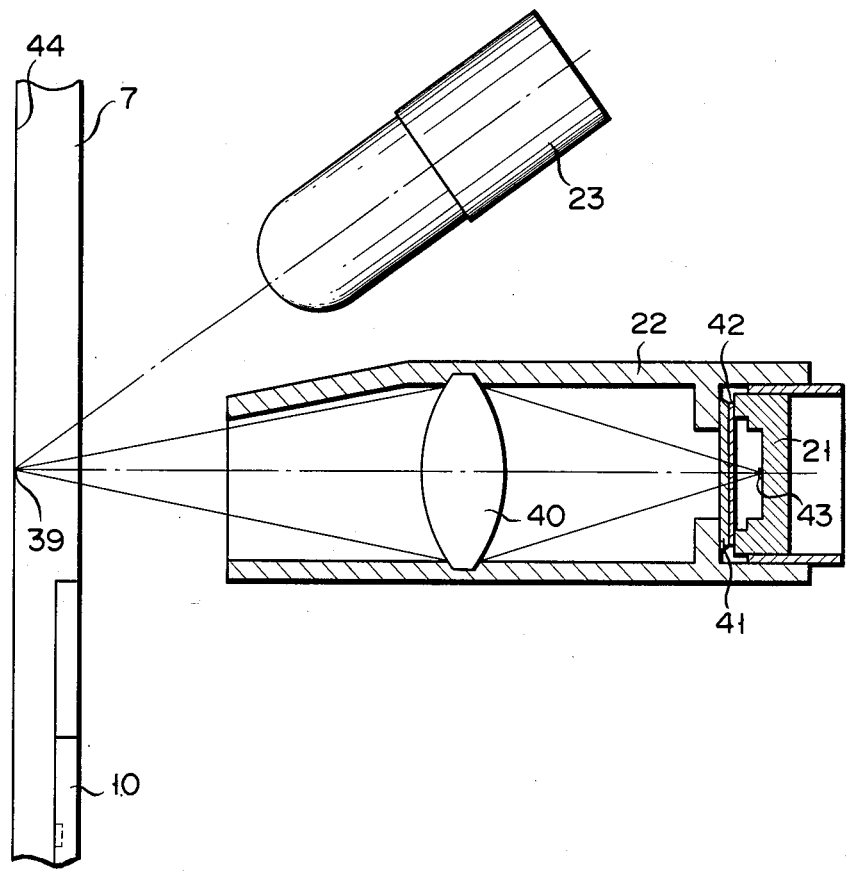
FIG. 4 is a plan view showing the positional relationship between the lens barrel, the light source, the printing head, and the document, with a section of the reading means shown in FIG. 3.

FIG. 4 is a plan view showing the section of the lens barrel 22 shown in FIG. 3 and the arrangement of the thermal head 10, a reading point 39 of the document, and the lamp 23. An optical lens 40 is housed in the lens barrel 22. Light from a character or figure at the reading point 39 is focused through the optical lens 40 and imaged at a light-receiving section 43 of the image sensor 21 through an infrared ray cutting filter 41 and a protective glass 2 behind the lens barrel 22. The lamp 23 is arranged at a position for optically illuminating the reading point 39. A 16-bit MOS line sensor is used as the image sensor 21, and the optical lens 40 is a wide-angle single lens having a focal length of 8 mm and an F number of 1.0. When the optical lens 40 is used, the lens barrel 22 is rendered compact in size and light in weight. Thus, the lens barrel 22 has a length of 30 m and an outer diameter of 10 mm. The lens barrel 22 having this size can be easily accomodated within a cassette 20 having a size of 40×60×15 mm. As can be seen from FIG. 4, the position of the lens barrel 22, including the image sensor opposing the reading point 39 of the document, is set such that the reading operation can be performed without interference of the thermal head 10.

Next, the document reading operation will be described. The thermal transfer ink tape cassette, mounted on the carriage for printing, is removed. Instead, the cassette 20 is mounted on the carriage 7. A document (FIG. 4) 44 is wound around the platen 2 through the sheet feed port 3. When a reading switch (not shown) is depressed, the carriage 7 is returned to the home position at the left end of the platen. In this state, the rack 14 and the hub 13 are not coupled through the gear mechanism. Then, the carriage 7 is moved, and with this movement, the character or figure at the reading point 39 of the document 44 illuminated by the lamp 23 is read by the light-receiving section 43 of the image sensor 21. When one line is completed, the carriage 7 returns to the left end, the paper sheet is fed on the platen and another reading operation is performed. When this operation is repeated, the characters or figures of the document 44 are read.

The printer has a motor which can feed the paper sheets at intervals of n/18 inch and n/144 inch (where n is the number of pulses supplied to the motor). The paper is fed at intervals of 1/9 inch where n is 2. The document is read by the light-receiving section 43 in which 16 bits are vertically aligned in a direction perpendicular to the direction of movement of the carriage 7. Therefore, the resolution in the vertical direction is 5.67 lines/mm, and head feeding is performed at intervals of 1/144 inch where n=1. Therefore, the image sensor 21 is moved at intervals of 0.176 mm to read one line of the document. When one line is read, the sheet is fed by 1/9 inch, and the next line is read in a similar manner. When a reciprocal-type printer is used, reciprocal readin can be performed and high-speed reading can be performed.

In the embodiment described above, the image sensor 21 and the like are housed inside the cassette 20, but a cassette need not always be used. However, when a cassette is used, handling is easy and a mode change from the printing mode to the reading mode and vice versa can be performed quickly.

An embodiment for color reading a document will be described with reference to FIGS. 5 and 6.

A reading window 33 opens in the front surface of a case 20. A recess 50 corresponds to the thermal head 10.

A lens barrel 22 in which an imaging lens 40 is arranged inside a cylinder with two open ends is fixed so as to have its front end opposing the reading window 33. A line image sensor (e.g., a MOS line image sensor having an array of 16 light-receiving elements) 21 for detecting an intensity of incident light is arranged at the rear end of the lens barrel 22.

A cylindrical-tape-feed roller 51 is rotatably arranged inside the case 20 to be adjacent to the lens barrel 22. When the case 20 is mounted on a carriage 7 of the printer, the tape-feed roller 51 is fitted with a ribbon-feed driving hub 13 of a ribbon-feed driving section 11 on the carriage 7. A pair of tape guide rollers 52 and 53 are arranged along the inside surface of the rear wall of the case 20. A tape guide plate 55 is arranged at a position inside the reading window 33. The tape guide plate 55 has an opening 54 at a position opposing the front end of the lens barrel 22.

Figure 5:
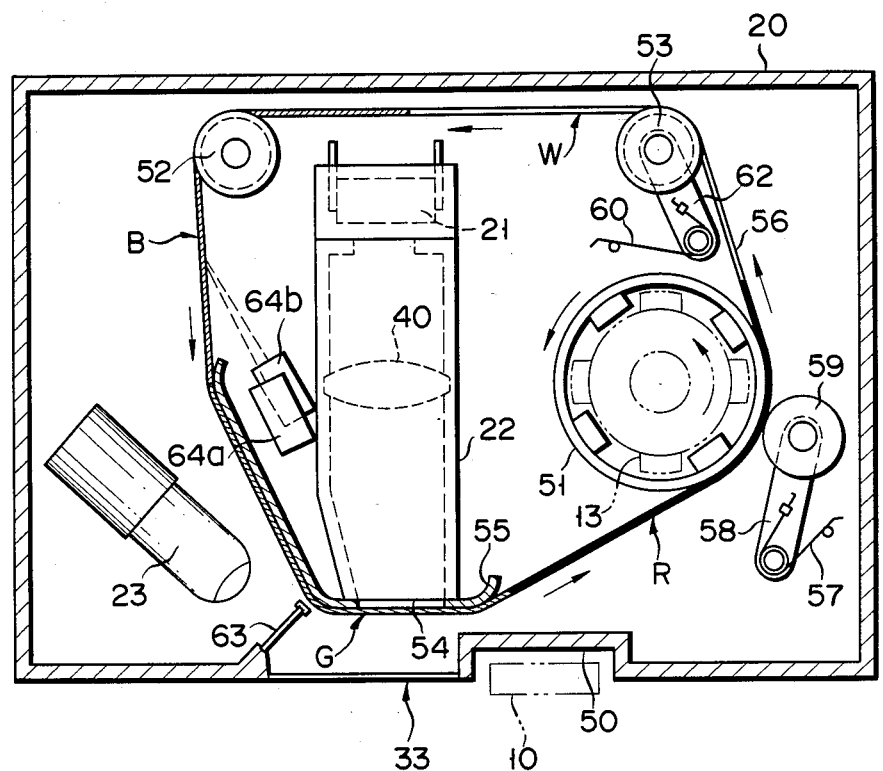
FIG. 5 is a cross-sectional view of a color reading means according to another embodiment of the present invention.

Referring to FIG. 5, an endless filter tape 56 has along its longitudinal direction a red transmission filter portion R, a green transmission filter portion G, a blue transmission filter portion B, and a black-and-white reading transparent filter portion W. The filter tape 56 is obtained by attaching four types of tape filters to each other such that each color filter portion R, G, B or W has the same length (e.g., 30 mm).

The filter tape 56 is looped around the tape-feed roller 51, the guide rollers 52 and 53, and the tape guide plate 55 and surrounds the lens barrel 22. The filter tape 56 is pressed toward the tape-feed roller 51 by a pinch roller 59, arranged at the distal end of a pivot arm 58 which is pressed toward the tape-feed roller 51 by a spring 57. Thus, the filter tape 56 is fed by the tape-feed roller 51. Of the tape guide rollers 52 and 53, the guide roller 53 behind the tape-feed roller 51 is arranged at the distal end of a pivot arm 62 urged outward by a spring 61 so as to apply a predetermined tension on the filter tape 56. The tape guide roller 52 is a fixed roller for guiding the filter tape 56 at a fixed position.

An incandescent lamp 23 with a lens for illuminating a reading surface of a document through the reading window 33 is arranged in the vicinity of the tape guide plate 55 inside the case 20. A color temperature conversion filter 63 is arranged in front of the lamp 23. The filter 63 serves to convert input light having spectral characteristics deviating toward infrared into white light.

Two color identification elements 64a and 64b for detecting the colors of the filter tape portion between the fixed roller 52 and the tape guide plate 55 are arranged inside of the tape guide plate 55.

Thus, the two color identification elements 64a and 64b detect the color of the tape portion between the fixed roller 52 and the tape guide plate 55 so as to determine which one of the filter portions currently opposes the lens barrel 22. The color identification element 64a is a red detection element having a red transmission filter on a light-receiving surface of a transducer element (e.g., a phototransistor). The color identification element 64b is a blue detection element having a blue transmission filter on a light-receiving surface of a similar transducer element.

The table below shows the relationship between the filter portion of the filter tape 56, which is detected by the two color identification elements 64a and 64b, and the filter portion in front of the lens barrel 22. For example, as shown in FIG. 5, when the blue transmission filter portion B is in front of the color identification elements 64a and 64b, an output from the red detection element 64a is 0 while that from the blue detection element 64b is 1. The order of the filters on the tape 56 is set such that the green transmission filter portion G is in front of the lens barrel 22 in this state. Thus, an output from the image sensor 21 is produced as a green signal. When the red transmission filter portion R is in front of the color identification elements 64a and 64b, an output from the red detection element 64a is 1, while that from the blue detection element 64b is 0. In this state, the black-and-white reading transparent filter portion W is in a position in front of the lens barrel 22. In this state, an output from the image sensor 21 is obtained as a black-and-white signal.

TABLE

| Red detection element | Blue detection element | Filter portion before color discrimination element | Filter portion before lens barrel |
|---|---|---|---|
| 0 | 0 | Green transmission filter portion | Red transmission filter portion |
| 0 | 1 | Blue transmission filter portion | Green transmission filter portion |
| 1 | 0 | Red transmission filter portion | Transparent filter portion |
| 1 | 1 (Output) | Transparent filter portion | Blue transmission portion |

The color identification elements 64a and 64b, the image sensor 21, and the lamp 23 are connected to terminals (not shown) arranged on the lower surface of the case 20 through an image sensor driver (not shown) and the like inside the case 20. These terminals are connected to connection terminals on the carriage 7 when the color reading apparatus is mounted on the carriage 7 of the printer. These terminals provide the connection between a reading control circuit, added to a printing control circuit utilizing a flexible connector connecting the carriage 7, and the printing control circuit inside the housing 1.

Figure 6:
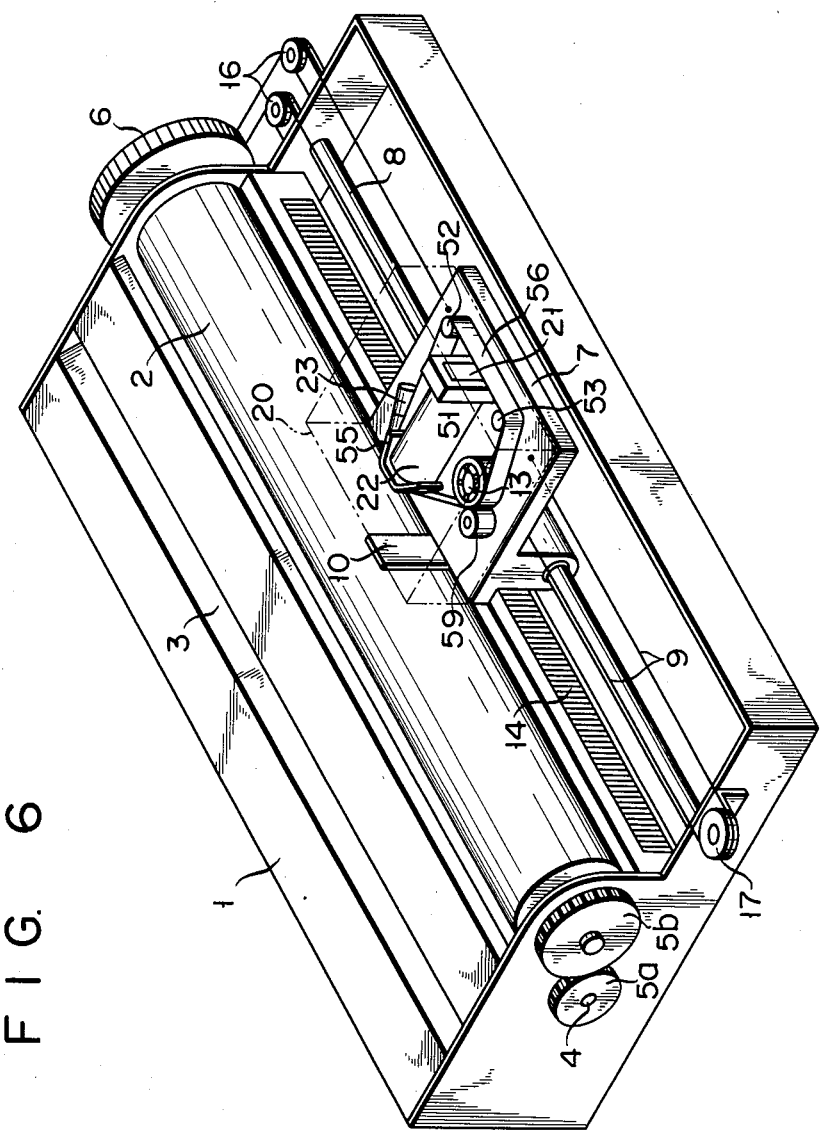
FIG. 6 is a perspective view of a printer wherein a cassette case having the color reading means shown in FIG. 5 is mounted on a carriage.
Figure 7:
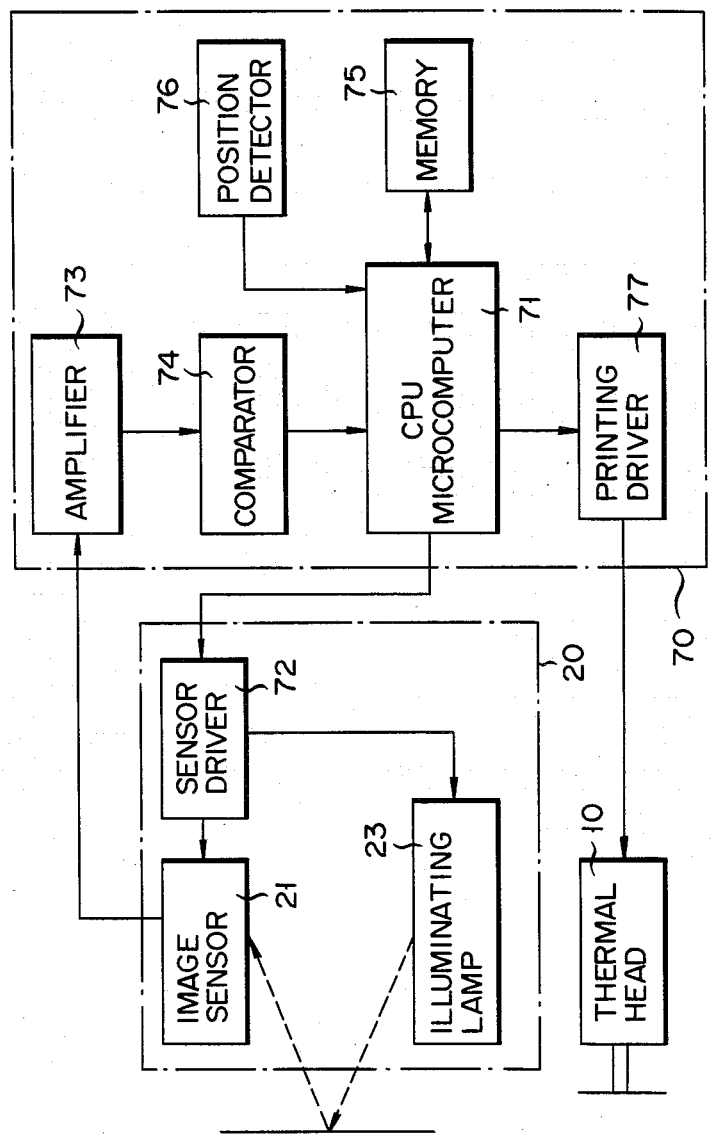

When a document is read, the ribbon cassette 15 mounted on the carriage 7 of the printer is replaced with the cassette 20 housing the color reading apparatus, as shown in FIG. 6. Color document reading can then be performed in the following manner.

The operation to be performed by the operator will first be described. The operator instructs a mode change from the printing mode to the reading mode so as to allow the printing control circuit to perform reading control. The operator then mounts the cassette 20 on the carriage 7 such that the tape-feed roller 51 inside the cassette 20 fits with the ribbon feed drive hub 13 of the ribbon-feed driving section 11 on the carriage 7. A document is inserted through the insertion port 3 of the printer and is wound around the platen 2. Thereafter, the operator depresses a start button to start a reading operation by the printer.

When the start button is depressed, the printer moves the carriage 7 to the home position at the left end of the platen 2 without feeding the film tape 56 inside the cassette 20 because the gear mechanism of the ribbon-feed driving section 11 of the carriage 7 is disengaged with the rack 14. In this state, the filter portion of the filter tape 56, which opposes the lens barrel 22 of the color reading apparatus, is detected by the color identification elements 64a and 64b inside the cassette 20. When the red transmission filter portion R for the first reading among the sequence of the red, green and blue reading is not in front of the lens barrel 22, the filter tape 56 is fed to align the filter portion R in front of the lens barrel 22.

The filter tape 56 is fed by moving the carriage 7 for a predetermined distance from the home position while the gear mechanism of the ribbon-feed driving section 11 meshes with the rack 14 of the housing 1. When the carriage 7 is moved in this manner, the ribbon-feed driving section 11 is driven, the tape-feed roller 51 is driven, and the filter tape 56 is driven until the red transmission filter portion R comes to the position in front of the lens barrel 22.

The moving distance of the carriage 7 in this case is determined in accordance with which one of the filter portions of the filter tape 56 is in front of the lens barrel 22 when the start button is depressed. For example, when the green transmission filter portion G next to the red transmission filter portion R is in front of the lens barrel 22 as shown in FIG. 5, in order to bring the red transmission filter portion R to the position in front of the lens barrel 22, the carriage 7 moves to feed the filter tape 56 for a distance corresponding to the lengths of the three other filter portions. When the transparent filter portion W is in front of the lens barrel 22, the carriage 7 moves to feed the filter tape 56 for a distance corresponding to one filter portion. Then, the red transmission filter portion R is positioned in front of the lens barrel 22.

When the carriage 7 is moved in this manner and the red transmission filter portion R is positioned in front of the lens barrel 22, the gear mechanism of the ribbon-feed driving section 11 disengages from the rack 14, and the carriage 7 is moved to the home position without feeding the filter tape 56. Next, while the gear mechanism of the ribbon feed section 11 of the carriage 7 is still disengaged from the rack 14, the carriage 7 is moved from the home position to the return position so as to move the cassette 20 along the widthwise direction of a document. The lamp 23 inside the cassette 20 illuminates the surface of the document, and the red component of the original is read by the image sensor 21 through the red transmission filter portion R.

After the red component of the original is read in this manner, the carriage 7 is moved back to the home position. Then, the gear mechanism of the ribbon-feed driving section 11 of the carriage 7 meshes with the rack 14, and the carriage 7 is moved. The filter tape 56 is fed to replace the red transmission filter portion R in front of the lens barrel 22 with the green transmission filter portion G. After the carriage 7 moves to the home position, it moves to the return position to allow the image sensor 21 to read the green component of the document surface through the green transmission filter portion G. A similar operation is repeated to move the blue transmission filter portion B to a position in front of the lens barrel 22, and the image sensor 21 reads the blue component of the document surface through the blue transmission filter portion B.

The red, green and blue components are read by scanning the same portion of the document (corresponding to the reading width of the image sensor 21) by moving the cassette 20 on the carriage 7. Color reading of the entire surface of the document is performed by rotating, three times, the platen 2 through an angle corresponding to the reading width of the image sensor 21 after reading red, green and blue components, thereby allowing the next portion of the document to be read to oppose the color reading apparatus.

The control section for the above embodiment is similar to that of the first embodiment. Further explanation thereof is therefore omitted for purposes of brevity.

When reading of a black-and-white document is to be performed or when a density of a color document is to be read, the transparent filter portion W of the filter tape 56 is positioned in front of the lens barrel 22, and a reading operation is performed once.

In the color reading apparatus described above, the filter tape 56 having the red, green and blue transmission filter portions R, G and B, the transparent filter portion W formed sequentially along the longitudinal direction, the tape-feed roller 51 for feeding the filter tape 56 upon engagement with the ribbon-feed driving section 11 of the carriage 7, and the image sensor 21 for reading the document wound around the platen 2 of the printer through the filter tape are arranged inside the case 20 which replaces the printing ribbon cassette 14 mounted on the carriage 7 of the printer. Therefore, the image sensor and the filters of the respective colors can be easily mounted on the carriage of the printer, and rotation of the filters of the respective colors is easy. Therefore, color reading utilizing a printer can be easily performed by a low cost reading system by filter rotation.

In the above embodiment, the filter tape 56 inside the color reading apparatus is fed by moving the carriage 7 for a predetermined distance from the home position. However, the filter tape 56 can be fed during the movement of the carriage 7 to the home position after the carriage 7 is moved to the return position for reading the color document. If the printer has a mechanism which engages with the ribbon-feed driving section 11 to drive it when the carriage 7 is in the home position, the filter tape 56 can be moved while the carriage 7 is kept in the home position. Alternatively, drive mechanisms for the ribbon-feed driving section 11 can be incorporated in the home and return positions of the carriage 7. In this case, the color reading apparatus can be reciprocated for reciprocal reading when the carriage 7 is moved from the home position to the return position and then returned from the return position to the home position. In this embodiment, the filter tape has the transparent filter portion W for black-and-white reading in addition to the red, green and blue transmission filter portions R, G and B. However, when the color reading apparatus is used for color reading only, the transparent filter portion W can be omitted.

What is claimed is:

1. A document reading apparatus adapted to be integrated with a printer mechanism, comprising:

carriage means for moving along a longitudinal direction of a platen and having an upper surface, a shaft projecting from said upper surface, and a ribbon-feed driving hub mounted on said shaft and rotatable to feed an ink ribbon in an ink ribbon cassette;

means for rotating said ribbon-feed driving hub as said carriage means moves in the longitudinal direction while a printer mechanism is operating;

a printing head fixed on said carriage means;

means associated with said carriage means for supporting an ink ribbon cassette of a certan shape when a sheet is wound around the platen and a printing operation is to be performed by said printing head;

cassette case means of a shape replaceable in the supporting means with the certain shape of said ink ribbon cassette and adapted to be mounted on said carriage means when a document is wound around said platen to be read and including a recess for admitting said ribbon-feed driving hub, said ink ribbon cassette being removed from said carriage when said document is to be read, and said cassette case means being removed from said carriage when a printing operation is to be performed, said printing head remaining fixed on said carriage means for the printing operation as well as when a document is read;

filter tape means housed within said cassette case means having a red transmission filter portion, a blue transmission filter portion and a green transmission filter portion which are formed and positioned between the document and said reading means such that said filter tape means can be fed, and has filter tape drive means for driving said filter tape means, said reading means performing color reading of the document through said filter tape means; and reading means housed inside said cassette case means and located at a position to avoid interference by said printing head during reading of the document while said cassette case means is mounted on said carriage means wherein said reading means has a lens barrel with an opening at one end opposing the document and housing therein an optical lens, an image sensor arranged at the other end of said lens barrel and on which an image of the document is made by said optical lens, and a light source for emitting light illuminating a reading point on the document.

2. An apparatus according to claim 1, including an ink ribbon-feed driving section mounted for rotation with movement of said carriage for driving ink ribbon in said ink ribbon cassette in a printing mode, and wherein said filter tape drive means feeds said filter tape means upon meshing with said ink ribbon-feed driving section.

* * * * *